(12) United States Patent
Gouardes et al.

(10) Patent No.: US 9,108,882 B2
(45) Date of Patent: Aug. 18, 2015

(54) SOLAR-PROTECTION GLAZING HAVING AN IMPROVED LIGHT TRANSMISSION COEFFICIENT

(75) Inventors: Eric Gouardes, Paris (FR); Sebastien Henry, Bures (FR); Sylvain Belliot, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 737 days.

(21) Appl. No.: 12/918,518

(22) PCT Filed: Feb. 25, 2009

(86) PCT No.: PCT/FR2009/050299
§ 371 (c)(1),
(2), (4) Date: Aug. 20, 2010

(87) PCT Pub. No.: WO2009/112759
PCT Pub. Date: Sep. 17, 2009

(65) Prior Publication Data
US 2011/0027554 A1 Feb. 3, 2011

(30) Foreign Application Priority Data
Feb. 27, 2008 (FR) ...................................... 08 51263

(51) Int. Cl.
*B32B 17/06* (2006.01)
*C03C 17/40* (2006.01)
*C03C 17/34* (2006.01)
*C03C 17/22* (2006.01)
*C03C 17/36* (2006.01)

(52) U.S. Cl.
CPC ............... *C03C 17/40* (2013.01); *C03C 17/225* (2013.01); *C03C 17/34* (2013.01); *C03C 17/36* (2013.01); *C03C 17/366* (2013.01); *C03C 17/3615* (2013.01); *C03C 17/3618* (2013.01); *C03C 17/3626* (2013.01); *C03C 17/3649* (2013.01); *C03C 17/3652* (2013.01); *C03C 17/3681* (2013.01); *Y10T 428/2495* (2015.01); *Y10T 428/24967* (2015.01); *Y10T 428/315* (2015.01)

(58) Field of Classification Search
CPC ........................................... C03C 17/36–17/40
See application file for complete search history.

(56) References Cited

U.S. PATENT DOCUMENTS

| | | |
|---|---|---|
| 4,806,220 A | 2/1989 | Finley |
| 5,059,295 A | 10/1991 | Finley |
| 5,652,046 A | 7/1997 | Beaufays et al. |
| 5,942,338 A | 8/1999 | Arbab et al. |
| 6,322,881 B1 | 11/2001 | Boire et al. |
| 2002/0192473 A1* | 12/2002 | Gentilhomme et al. ...... 428/432 |
| 2003/0180547 A1* | 9/2003 | Buhay et al. .................. 428/434 |
| 2004/0137234 A1* | 7/2004 | Stachowiak .................. 428/428 |
| 2004/0241457 A1 | 12/2004 | Macquart et al. |
| 2005/0079369 A1 | 4/2005 | Stachowiak |
| 2005/0123772 A1 | 6/2005 | Coustet et al. |
| 2005/0155695 A1 | 7/2005 | O'Shaughnessy et al. |
| 2005/0208281 A1 | 9/2005 | Decroupet et al. |
| 2006/0172138 A1 | 8/2006 | Stachowiak |
| 2007/0218311 A1 | 9/2007 | O'Shaughnessy et al. |

FOREIGN PATENT DOCUMENTS

| | | |
|---|---|---|
| EP | 0 546 302 | 6/1993 |
| EP | 0 719 876 | 7/1996 |
| EP | 1 630 142 | 3/2006 |
| FR | 2 799 005 | 3/2001 |
| WO | WO 99/25661 | 5/1999 |
| WO | WO 2005/105687 | 11/2005 |

OTHER PUBLICATIONS

Dobrowolski, J.A. "Optical Properties of Films and Coatings". Handbook of Optics: vol. I, Fundamentals, Techniques, and Design, ed. Bass et al., (1995); pp. 42.3-42.130.*
"Materials". Collins English Dictionary, http://www.collinsdictionary.com/dictionary/english/materials. Retrieved Oct. 19, 2014.*
"Alloy". Merriam-Webster Dictionary, http://www.merriam-webster.com/dictionary/alloy. Retrieved Oct. 19, 2014.*
International Search Report issued Oct. 5, 2009 in PCT/FR2009/050299.
European Standard "Glass in building—Determination of luminous and solar characteristics of glazing" Dec. 1997 CEN Ref. No. prEN 410:1997 E.
http://www.google.de/search?q=%22NFEN+673%22 "NFEN 673" Oct. 26, 2012.

* cited by examiner

*Primary Examiner* — Prashant J Khatri
(74) *Attorney, Agent, or Firm* — Oblon, McClelland, Maier & Neustadt, L.L.P.

(57) ABSTRACT

The invention relates to a transparent glass substrate including at least one glass sheet provided with a thin-film multilayer coating acting on solar radiation, having a light transmission of greater than 10% and an emissivity of less than 50% after a heat treatment, such as a bending or toughening treatment, characterized in that said multilayer coating includes: a niobium Nb functional layer with a thickness of between about 5 nm and about 35 nm; and at least one layer of another material, chosen from the group formed by Ti, Mo, B, Al or an alloy comprising at least one of these elements, which is placed relative to the glass substrate above the functional layer, said layer having a thickness of between about 1 nm and about 5 nm. The invention also relates to monolithic glazing or double glazing incorporating such a substrate.

14 Claims, No Drawings

SOLAR-PROTECTION GLAZING HAVING AN IMPROVED LIGHT TRANSMISSION COEFFICIENT

The invention relates to glazing provided with thin-film multilayer coatings, one of the layers of which is a functional layer, that is to say it acts on solar radiation. The present invention relates more particularly to multilayer-coated glazing, especially that intended for thermal insulation and/or solar protection.

The term "functional" layer is understood within the context of the present invention to mean the layer or layers of the multilayer coating that give the latter most of its thermal properties, as opposed to the other layers, which are generally made of a dielectric material and have the function of chemically or mechanically protecting said functional layers, or else another function, for example an optical function, adhesion function, etc.

The solar-protection glazing according to the invention is more particularly suitable for fitting into buildings: by limiting the amount of solar radiation energy transmitted, thanks to the thin layers, such glazing prevents the interior of rooms from being excessively heated in the summer and thus helps to limit the consumption of energy needed for air-conditioning them.

The invention also relates to this type of glazing once it has been covered with said thin layers, in order to obtain a wall cladding panel, called more conventionally "curtain walling", which makes it possible, in combination with window glazing, to provide buildings with exterior surfaces that are entirely glazed.

Solar-protection functional multilayer-coated glazing is subject to a number of constraints: firstly, the layers employed must filter out the solar radiation sufficiently, and especially the non-visible part of the solar radiation lying between about 780 nm and 2500 nm, usually called solar infrared (or solar IR). Furthermore, this thermal performance must preserve the optical and aesthetic appearance of the glazing: in particular, it is desirable to be able to modulate the level of light transmission ($T_L$) of the substrate.

According to another important aspect, the functional layers must be sufficiently durable and, in particular, physically resistant, such as scratch resistant, and chemically resistant—they must in particular be moisture resistant. This is all the more important if, in the glazing once fitted, said functional layers are on one of the exterior faces of the glazing (as opposed to the "interior" faces turned towards the intermediate gas-filled cavity of for example a double-glazing unit) or if the glazing is single glazing, i.e. comprising only a single glass sheet.

There is another constraint that arises during the production of the glazing: when the latter consists at least partly of glass substrates, these usually have to undergo one or more heat treatments, which may be a bending operation if it is desired to shape them (to form a shop window), but which is often a toughening or annealing operation, especially in the building sector in which it is desired for the glazing to be more resistant and less hazardous in the event of impacts. The fact that the layers are deposited on the glass before its heat treatment frequently means that they are damaged and their properties, especially optical properties, are substantially modified. However, depositing the layers after the heat treatment of the glass proves to be complex and expensive.

An example of solar-protection glazing for buildings is given in patents EP-0 511 901 and EP-0 678 483: these refer to functional layers for filtering out solar radiation which are made of a nickel-chromium alloy, optionally nitrided, made of stainless steel or of tantalum, and which are placed between two dielectric layers of metal oxide such as $SnO_2$, $TiO_2$ or $Ta_2O_5$. Such glazing provides good solar protection, with satisfactory mechanical and chemical durability, but it is not truly "bendable" or "toughenable" within the meaning described above, since the oxide layers surrounding the functional layer do not prevent it from being oxidized during the bending or toughening operation, said oxidation being accompanied by a substantial modification in the light transmission and in the general appearance of the glazing in its entirety.

More recently Patent Application EP 1 218 307 has proposed a solar-protection multilayer coating, the functional layer of which comprises an optionally nitrided metal chosen from Nb, Ta and Zr, the functional layer being surmounted by protective layers based on aluminium nitride or oxynitride or on silicon nitride or oxynitride. The multilayer coating according to this application gives the glazing a solar-protection function enabling it to block out the solar IR of the incident solar radiation. Furthermore, this multilayer coating proves to be resistant to the toughening operation and mechanically and chemically durable sufficiently to be used as face 2 of single glazing. However, the major drawback of the multilayer coating described in EP 1 218 307 is that the functional layer is relatively thick, so as to obtain the desired solar-protection effect, and consequently has a very low $T_L$, of the order of 10%, or even less.

The object of the invention is thus to substantially increase the light transmission $T_L$ of such solar-protection glazing, without thereby such an increase leading to an appreciable reduction in the thermal insulation properties of the glazing, which could result in excessive heat transfer between the interior and the exterior of the building or of the passenger compartment protected by said glazing.

Glazing capable of meeting such an application is known in the field. Such glazing is coated with one or more thin functional layers of metallic silver Ag. Such glazing is for example described in the Patent Application EP 718 250. It is well known that incorporating one or more silver layers into the glazing enables the heat transfer through the glazing to be very greatly reduced, because of the low emissivity of the Ag layers, i.e. their ability to reflect most of the thermal IR lying between 3 and 50 microns. It is then possible to obtain, using well-known techniques and especially the addition of dielectric interference layers of suitable index and thickness, glazing that has a high light transmission but the heat transfer coefficient of which nevertheless remains very low.

The solar-protection layers based on thin silver films thus appear to be very efficient in respect of thermal insulation but their mechanical and chemical durability is very limited, in particular when in contact with a wet atmosphere, and in particular prevents them from being used for single glazing. Furthermore, this solution is relatively expensive to implement in the case of double glazing.

The invention therefore consists in the development of novel thin-film multilayer coatings that act on solar radiation, with a view to manufacturing improved solar-protection glazing. The intended improvement is in particular the establishment of a better compromise between durability, thermal properties, optical properties and solar-protection function, in particular light transmission, and capability of withstanding heat treatment without being damaged when the substrate bearing the multilayer coating is of the glass type.

More precisely, the object of the present invention is therefore to provide glazing coated with thin layers that give it good solar-protection properties and a light transmission equal to or greater than 10% or even 20%, but however still having an acceptable heat transfer coefficient, thanks in particular to a sufficiently low emissivity coefficient α, as defined according to the European standard prEN 410, said multi-layer-coated glazing also being able to undergo a heat treatment as explained above.

According to the invention, such single or multiple glazing has been able to be obtained that has in particular:
- a light transmission equal to or greater than 10% or greater than 20%, or even 30% or 40%;
- an emissivity equal to or less than 50%, preferably less than 40% or less than 30% or even 20%;
- resistance to heat treatment such as a bending or toughening operation, especially with the above properties being maintained, and chemical resistance, as described above; and
- good chemical and mechanical durability.

The subject of the invention thus firstly consists of a transparent glass substrate comprising at least one glass sheet provided with a thin-film multilayer coating acting on solar radiation, having a light transmission equal to or greater than 10% or even greater than 20% and an emissivity equal to or less than 50%, or less than 40%, or even less than 30% or 20% after a heat treatment, such as a bending or toughening treatment, said multilayer coating comprising:
- a functional layer based on niobium Nb with a thickness of between about 5 nm and about 35 nm; and
- at least one layer of another material, chosen from the group formed by Ti, Mo, B, Al or an alloy comprising at least one of these elements, which is placed relative to the glass substrate above the functional layer, said layer having a thickness of between about 1 nm and about 5 nm.

According to a possible embodiment, the transparent glass substrate comprises at least one glass sheet provided with a thin-film multilayer coating acting on solar radiation, having a light transmission equal to or greater than 20% and an emissivity equal to or less than 50% after a heat treatment, such as a bending or toughening treatment, said multilayer coating comprising:
- a functional layer based on niobium Nb with a thickness of between about 5 nm and about 25 nm; and
- at least one layer of another material, chosen from the group formed by Ti, Mo, B, Al or an alloy comprising at least one of these elements, which is placed relative to the glass substrate above the functional layer, said layer having a thickness of between about 1 nm and about 5 nm.

Preferably, a layer of said material chosen from the group formed by Ti, Mo, B, Al is placed above the functional layer and another layer of said material is placed beneath the functional layer.

Typically, the functional layer based on niobium Nb has a thickness of between 8 nm and about 20 nm, for example of between 8 nm and 15 nm.

Typically, the layer of material chosen from the group formed by Ti, Mo, B, Al has a thickness of between about 1 nm and about 3 nm.

Preferably, said material is Ti.

According to the invention, the combination of the functional layer and of the layer or layers of said material is surrounded by at least one additional layer based on aluminium nitride, aluminium oxynitride, silicon nitride or silicon oxynitride, or based on a mixture of at least two of these compounds, the thickness of said additional layer or layers being adjusted in order to optimize the light transmission of the glazing.

For example, said additional layer or layers are based on silicon nitride and are placed above and below said combination respectively.

According to one possible embodiment, the layer based on silicon nitride placed above said combination is thicker than the layer placed beneath the combination by at least a factor of 1.2 especially at least a factor of 1.5 to 1.8.

The invention also relates to monolithic glazing or double glazing incorporating the substrate as described above, the multilayer coating of thin layers being placed on face 2 of the monolithic glazing or of the double glazing, or on face 3 of the double glazing, the faces of the substrate or substrates being numbered from the exterior to the interior of the building or of the passenger compartment that it equips.

According to one embodiment, the monolithic glazing or double glazing is configured to have a light transmission $T_L$ of greater than 10%, 20% or even 30%, or even greater than 40%. The monolithic glazing or double glazing may also be configured to have an emissivity of less than 40%, or less than 30% or even less than 20%.

Finally, the present invention relates to a wall cladding panel of the curtain-walling type, incorporating at least one substrate as described above or to a side window, rear window or sunroof for an automobile, or another vehicle, formed by or incorporating said substrate.

According to the invention, the functional layers of the invention make it possible for the substrate to have a relatively high light transmission, while still maintaining an appreciable solar-protection effect, despite the relatively small thickness of the functional layer: the measurements made show in fact a good compromise between the level of light transmission $T_L$ and the heat transfer coefficient U of the multilayer-coated substrate, as measured by its emissivity α. In the present description, the emissivity is a normal emissivity as defined according to the standard prEN 410.

The use of a very thin layer of a metal of the group Ti, Mo, B, Al, in particular Ti, makes it possible according to the invention to guarantee the toughenability of the multilayer coating without an accompanying degradation in the functional properties thereof. In particular, the change in optical properties, especially the light transmission, caused by a toughening heat treatment, is low. Likewise, the emissivity of the functional layer remains low thanks to the addition of this additional thin metal layer.

According to one possible embodiment of the invention, the thin layer of metal of the group Ti, Mo, B, Al is deposited at least on top of the Nb functional layer. Preferably, said layer is deposited on top of and beneath the Nb layer.

In the present description, the terms "on top of" and "beneath" refer to the respective position of said layers relative to the glass substrate supporting the multilayer coating comprising said layers.

According to one embodiment of the invention, it is preferable to deposit also an overlayer based on silicon or aluminium nitride ($Si_3N_4$ and AlN) or based on silicon or aluminium oxynitride (SiON and AlNO in short, without judging the respective quantities of Si, O and N). The thickness of such layers is adjusted so as to obtain an antireflection effect enabling the light transmission of the multilayer-coated glazing to be optimized. Such layers may also play, to a lesser extent, a role of protecting the functional layers of the invention. Without departing from the scope of the invention, it is also possible according to the invention to dope these layers with elements such as Zr, B, etc., so as to modify the colour of the glazing in transmission and/or in reflection, in accordance with the well-known techniques in the field.

Preferably, the multilayer coating according to the invention comprises, between the substrate and the functional layer, at least one underlayer made of a transparent dielectric, especially chosen, as in the case of the overlayer, to be silicon nitride or oxynitride and/or aluminium nitride or oxynitride, or else silicon oxide $SiO_2$. In particular, its presence may make it possible for the optical appearance conferred on the carrier substrate by its multilayer coating to be varied more flexibly. Furthermore, in the case of heat treatment, said underlayer may constitute an additional barrier, in particular to oxygen and to alkali metals from the glass substrate, which species are liable to migrate due to the heat and degrade the multilayer coating.

A very preferred variant of the invention may for example consist in using both an overlayer and an underlayer based on silicon nitride.

The thickness of the overlayer is preferably between 5 and 70 nm, especially between 40 and 60 nm. The thickness of the optional underlayer is preferably between 5 and 120 nm.

When there is a single underlayer of the $Si_3N_4$ type, its thickness is for example between 30 and 50 nm.

The underlayer and/or the overlayer may in fact form part of a superposition of dielectric layers. One or other layer may thus be combined with other layers of different refractive indices. Thus, the multilayer coating may comprise, between the substrate and the functional layer (or on top of the functional layer) an alternation of three, high index/low index/high index, layers, the "high index" layer (having an index of at least 1.8 to 2) or one of said layers possibly being the sublayer of the invention of the $Si_3N_4$ or AlN type and the "low index" layer (for example of index less than 1.7) possibly being made of silicon oxide $SiO_2$.

More particularly, a very preferred embodiment of the invention consists of single or multiple glazing comprising a substrate on which is deposited a multilayer coating comprising a functional layer based on niobium with a Ti layer on either side thereof, the combination of the Ti/Nb/Ti layers itself being surmounted by an overlayer based on silicon nitride and by an underlayer also based on silicon nitride.

The subject of the invention applies both to single or "monolithic" glazing, i.e. consisting of a single substrate, and insulating multiple glazing of the double-glazing type. Preferably, whether in monolithic glazing or double glazing, the multilayer coatings are placed on face 2 (conventionally, the faces of the panes/substrates of glazing are numbered from the outside to the inside of the passenger compartment/room equipped therewith) and protect against solar radiation. Without departing from the scope of the invention, the multilayer coatings may also be deposited on face 3 of double glazing.

Another subject of the invention is a multilayer-coated substrate at least partially opacified by covering of the lacquer or enamel type, with the purpose of producing curtain walling, where the opacifying covering is in direct contact with the multilayer coating. The multilayer coating may therefore be exactly the same both for window glazing and for curtain walling.

Although the application more particularly intended by the invention is architectural glazing, it is clear that other applications can be envisaged, especially automotive glazing (apart from windscreens, which require a very high light transmission), such as the side windows, sunroof and rear window.

The invention and its advantages will be described in greater detail below by means of the following non-limiting examples according to the invention and comparative examples. In all the examples and the description, the thicknesses are geometric thicknesses.

All the substrates are made of clear glass 6 mm in thickness of the Planilux type sold by Saint-Gobain Vitrage.

All the layers were deposited in a known manner by magnetron sputtering. The metal (Nb, Ti) layers were deposited from metal targets in an inert atmosphere (100% Ar), the silicon nitride $Si_3N_4$ layers were deposited from a suitable silicon target (the silicon being doped with 8% aluminium by weight) in a reactive atmosphere containing nitrogen (40% Ar/60% $N_2$). The $Si_3N_4$ layers therefore contain a little aluminium.

EXAMPLE 1

According to EP 1 218 307

This example has an Nb functional layer, an $Si_3N_4$ underlayer and an $Si_3N_4$ overlayer according to the following sequence:

glass/$Si_3N_4$ (10 nm)/Nb (35 nm)/$Si_3N_4$ (30 nm).

After the layers had been deposited, the substrate underwent the following heat treatment:

heating at 620° C. for 10 minutes followed by quenching.

EXAMPLE 2

Comparative Example

In this example, the same functional layer and the other layers as in Example 1 were used, these being deposited on the same substrate but with modifications in the thicknesses of the $Si_3N_4$ underlayer and overlayer:

glass/$Si_3N_4$ (40 nm)/Nb (10 nm)/$Si_3N_4$ (60 nm).

The substrate coated with the multilayer coating then underwent the same heat treatment as described in Example 1.

EXAMPLE 3

According to the Invention

This example uses the same sequence of layers as in Example 2, deposited on the same substrate, but with a very thin metallic titanium layer deposited on top of the functional layer. The multilayer coating thus comprises the following succession of layers:

glass/$Si_3N_4$ (40 nm)/Nb (10 nm)/Ti (about 1 nm)/$Si_3N_4$ (60 nm).

The substrate coated with the multilayer coating then underwent the same heat treatment as described in Example 1 or Example 2.

EXAMPLE 4

Comparative Example

This example uses the same sequence of layers as in Example 2, deposited on the same substrate, but a very thin metallic titanium layer is deposited beneath the functional layer. The multilayer coating thus comprises the following succession of layers:

glass/$Si_3N_4$ (40 nm)/Ti (about 1 nm)/Nb (10 nm)/$Si_3N_4$ (60 nm).

The substrate coated with the multilayer coating then undergoes the same heat treatment as described in Example 1 or 2.

EXAMPLE 5

According to the Invention

This example uses the same sequence of layers as in Example 2, deposited on the same substrate, but a very thin titanium metal layer is deposited on top of and beneath the functional layer. The multilayer coating thus comprises the following succession of layers:

glass/$Si_3N_4$ (40 nm)/Ti ($\approx$1 nm)/Nb (10 nm)/Ti ($\approx$1 nm)/$Si_3N_4$ (60 nm).

The substrate coated with the multilayer coating then underwent the same heat treatment as described in Example 1 or 2.

EXAMPLE 5b

According to the Invention

This example uses the same sequence of layers as in Example 2, deposited on the same substrate. The multilayer coating thus comprises the following succession of layers:

glass/$Si_3N_4$ (40 nm)/Ti ($\approx$1 nm)/Nb (19 nm)/Ti ($\approx$1 nm)/$Si_3N_4$ (50 nm).

The substrate coated with the multilayer coating then underwent the same heat treatment as described in Example 1 or 2.

EXAMPLE 6

Comparative Example

This example used the same sequence of layers as in Example 2, deposited on the same substrate, but a very thin NiCr layer is deposited on top of and beneath the functional layer. The multilayer coating thus comprises the following succession of layers:

glass/$Si_3N_4$ (40 nm)/NiCr ($\leq$1 nm)/Nb (10 nm)/NiCr ($\approx$1 nm)/$Si_3N_4$ (60 nm).

The substrate coated with the multilayer coating then underwent the same heat treatment as described in Example 1 or 2.

Table 1 below gives the measured optical transmission $T_L$ values (the light transmission being in % under illuminant $D_{65}$) and the emissivity α values, which are calculated according to the prEN 410 and NFEN 673 standards, for Examples 1 to 6 above.

The values are given twice, once before heat treatment and once after heat treatment. In the table 1 the relative rise Δα of the emissivity α value, after the quenching, is reported in percentage.

TABLE 1

| EXAMPLE | Heat treatment | Optical and energy properties | | |
|---|---|---|---|---|
| | | $T_L$ | α (%) | Δα (%) |
| Example 1 | Before | 11.3 | 14 | 29 |
| | After | 18.5 | 18 | |
| Example 2 | Before | 41.8 | 39 | 36 |
| | After | 37.6 | 55 | |
| Example 3 (according to the invention) | Before | 40.9 | 35 | 20 |
| | After | 38.8 | 42 | |
| Example 4 | Before | 42.6 | 34 | 41 |
| | After | 39.2 | 48 | |
| Example 5 (according to the invention) | Before | 41.7 | 32 | 16 |
| | After | 40.3 | 37 | |
| Example 5b (according to the invention) | Before | 26.1 | 18 | 11 |
| | After | 24.0 | 20 | |
| Example 6 | Before | 39.1 | 34 | 41 |
| | After | 35.2 | 48 | |

The values given in Table 1 show that Examples 3, 5 and 5b according to the invention provide a much higher light transmission than the solar-protection glazing of the prior art, while still maintaining acceptable energy performance, after the heat treatment and toughening operation. The comparison of the emissivity values obtained after toughening for Example 4 with the values obtained for Examples 3, 5 and 5b show that the best compromises are obtained when a Ti metal layer is deposited at least on top of the Nb functional layer.

The results obtained for Example 2, which is not according to the present invention (since the multilayer coating is not provided with one or more Ti metal layers), are much inferior after the toughening operation. These multilayer coatings are clearly not bendable/toughenable within the meaning of the invention. The heat treatment significantly degrades the thermal insulation properties: the emissivity values of such glazing thus appear to be much too high. The results obtained according to Example 6, in which the metal layer deposited on the functional layer is this time made of NiCr, are similar to those obtained for Example 2, i.e. in the absence of a layer.

EXAMPLE 7

According to the Invention

For this example, a multiple glazing unit was constructed from the substrate of Example 5 (after the toughening operation). The multiple glazing unit was assembled according to the conventional techniques in a 6/12/6$^{clear}$ (100% air) configuration, i.e. in such a way that it is made up of two clear glass sheets 6 mm in thickness separated by a 12 mm thick air space. The multilayer coating was deposited on face 2 of the double glazing unit.

The double glazing unit has a light transmission of 36% but a relatively low emissivity, about 37%, enabling most of the thermal IR radiation to be reflected. The energy insulation performance is thus very satisfactory, the heat transfer coefficient U having been measured to be 2.30 W·m$^{-2}$·K$^{-1}$. For comparison, the coefficient U is equal to 2.90 W·m$^{-2}$·K$^{-1}$ for a simple, i.e. not multilayer-coated, double glazing unit. Again for comparison, the low-E transparent glazing of the prior art, incorporating as functional layer a not easily toughenable silver layer, has a coefficient of around 1.8 W·m$^{-2}$·K$^{-1}$, but are very much less durable, both in terms of chemical resistance and mechanical resistance.

EXAMPLE 8

According to the Invention

In this example, the aim was to obtain a multiple glazing unit based on a substrate in which the layers of the multilayer coating have thicknesses suitable this time for maximizing the energy performance of the glazing.

The multilayer coating thus comprises the following succession of layers:

glass/Si$_3$N$_4$ (40 nm)/Ti (≈1 nm)/Nb (20 nm)/Ti (≈1 nm)/Si$_3$N$_4$ (54 nm).

The substrate coated with the multilayer coating then underwent the same heat treatment as described above.

A multiple glazing unit was then manufactured from this substrate. In a manner similar to Example 7, the multiple glazing unit was assembled in a 6/12/6$^{clear}$ (100% air) configuration. The multilayer coating was deposited on face 2 of the double glazing unit.

The double glazing unit thus has a light transmission of about 20%, lower than that of Example 5, but a much lower emissivity, about 18%, enabling the thermal radiation to be strongly reflected, and greatly improved energy insulation performance, the measured heat transfer coefficient U this time being equal to 1.98 W·m$^2$·K$^{-1}$.

In conclusion, the solar-protection glazing according to the invention is very advantageous for fitting into buildings, without being excluded for applications in cars and all vehicles: namely side windows, rear window and sunroof, which may also have enamelled coatings. With a fixed multilayer coating, especially with the desired T$_L$ and thermal insulation values, it is thus possible to manufacture solar-protection glazing providing improved vision, but which can be bent/toughened/annealed, and having very good mechanical and chemical durability.

Without departing from the scope of the invention, it is also possible to produce multilayer-coated curtain walling that is enamelled, rather than lacquered, this being industrially highly advantageous, enamelling taking place during the toughening process whereas lacquering requires an additional manufacturing step.

The invention claimed is:

1. A transparent glass substrate comprising at least one glass sheet having a thin-film multilayer coating, wherein the transparent glass substrate has a light transmission equal to or greater than 10% under illuminant D$_{65}$ and an emissivity equal to or less than 50%, and said multilayer coating comprises:

a functional layer consisting essentially of Nb and having a thickness in a range of from 5 nm to 35 nm; and at least one layer of another material, wherein said another material is selected from the group consisting of Ti, Mo, B, Al, and mixtures thereof, wherein the at least one layer of another material is placed relative to the glass substrate above the functional layer and in direct contact with the functional layer, wherein the at least one layer of another material has a thickness in a range of from 1 nm to 5 nm, and wherein the transparent glass substrate has a light transmission equal to or greater than 10% under illuminant D$_{65}$ and an emissivity equal to or less than 50% before and after heat treatment.

2. The transparent glass substrate according to claim 1, comprising at least one glass sheet having a thin-film multilayer coating, wherein said multilayer coating comprises:

a functional layer consisting essentially of Nb and having a thickness in a range of from 5 nm to 25 nm; and at least one layer of another material, wherein said another material is selected from the group consisting of Ti, Mo, B, Al, and mixtures thereof, wherein the at least one layer of another material is placed relative to the glass substrate above the functional layer and in direct contact with the functional layer, wherein the at least one layer of another material has a thickness in a range of from 1 nm to 5 nm, and wherein the transparent glass substrate has a light transmission equal to or greater than 20% under illuminant D$_{65}$ and an emissivity equal to or less than 50% before and after heat treatment.

3. The transparent glass substrate according to claim 1, wherein a layer of said material selected from the group consisting of Ti, Mo, B, and Al is placed above the functional layer and another layer of said material is placed beneath the functional layer.

4. The transparent glass substrate according to claim 1, wherein the functional layer has a thickness in a range of from 8 nm to 20 nm.

5. The transparent glass substrate according to claim 1, wherein the at least one layer of another material is selected from the group consisting of Ti, Mo, B, and Al, and has a thickness in a range of from 1 nm to 3 nm.

6. The transparent glass substrate according to claim 1, wherein said at least one layer of another material is Ti.

7. The transparent glass substrate according to claim 1, wherein a combination of the functional layer and the at least one layer of another material is surrounded by at least one additional layer comprising at least one compound selected from the group consisting of an aluminium nitride compound, an aluminium oxynitride compound, a silicon nitride, a silicon oxynitride compound, and mixtures thereof.

8. The transparent glass substrate according to claim 7, wherein said additional layer comprises silicon nitride.

9. The transparent glass substrate according to claim 8, wherein an additional layer is placed above said combination and an additional layer is placed below said combination, wherein the layer having silicon nitride placed above said combination is thicker than the layer placed beneath the combination by at least a factor of 1.2.

10. A monolithic glazing or double glazing unit comprising the substrate according to claim 1 and at least one face, the multilayer coating of thin layers being placed on the at least one face of the monolithic glazing unit or of the double glazing.

11. The monolithic glazing or double glazing unit according to claim 10, having a light transmission TL of greater than 10%.

12. The monolithic glazing or double glazing unit according to claim 11, having an emissivity of less than 40%.

13. A wall cladding panel, comprising at least one substrate according to claim 1.

14. A side window, rear window or sunroof, comprising the substrate according to claim 1.

* * * * *